United States Patent
Cho

(10) Patent No.: US 9,823,521 B2
(45) Date of Patent: Nov. 21, 2017

(54) APPARATUS AND LIQUID CRYSTAL DISPLAY DEVICE WITH COLUMN SPACERS

(71) Applicant: LG Display Co., Ltd., Seoul (KR)

(72) Inventor: Sung Hyun Cho, Seoul (KR)

(73) Assignee: LG Display Co., Ltd., Seoul (KR)

( * ) Notice: Subject to any disclaimer, the term of this patent is extended or adjusted under 35 U.S.C. 154(b) by 262 days.

(21) Appl. No.: 14/643,781

(22) Filed: Mar. 10, 2015

(65) Prior Publication Data

US 2015/0253608 A1    Sep. 10, 2015

Related U.S. Application Data

(60) Provisional application No. 61/950,645, filed on Mar. 10, 2014.

(30) Foreign Application Priority Data

Jun. 23, 2014    (KR) .......................... 10-2014-0076731

(51) Int. Cl.
G02F 1/1335    (2006.01)
G02F 1/1339    (2006.01)

(52) U.S. Cl.
CPC .... *G02F 1/13394* (2013.01); *G02F 1/133512* (2013.01); *G02F 2001/13396* (2013.01)

(58) Field of Classification Search
USPC .................... 349/110, 106, 155–157; 257/72
See application file for complete search history.

(56) References Cited

U.S. PATENT DOCUMENTS

| | | | | |
|---|---|---|---|---|
| 5,828,434 A | * | 10/1998 | Koden | G02F 1/133512 349/110 |
| 8,400,588 B2 | * | 3/2013 | Yang | G02F 1/1335 349/106 |
| 8,681,306 B2 | * | 3/2014 | Koito | G02F 1/13338 349/155 |
| 2007/0132936 A1 | * | 6/2007 | Lee | G02F 1/13394 349/156 |
| 2015/0253607 A1 | * | 9/2015 | Cho | G02F 1/13394 349/110 |
| 2015/0346533 A1 | * | 12/2015 | Park | G02F 1/13394 349/42 |

* cited by examiner

Primary Examiner — Huyen Ngo
(74) Attorney, Agent, or Firm — Fenwick & West LLP

(57) ABSTRACT

Disclosed are an apparatus and an LCD device. An apparatus includes a color filter (CF) substrate having a black matrix layer, a thin-film transistor (TFT) substrate facing said CF substrate, a column spacer array, between said CF substrate and said TFT substrate, corresponding to certain portions of said black matrix layer, and a structure, between said CF substrate and said TFT substrate, corresponding to said column spacer array and configured to protect said column spacer array from damage due to external pressure.

12 Claims, 6 Drawing Sheets

APPARATUS AND LIQUID CRYSTAL DISPLAY DEVICE WITH COLUMN SPACERS

CROSS-REFERENCE TO RELATED APPLICATIONS

This application claims the benefit of the U.S. Patent Application No. 61/950,645 filed on Mar. 10, 2014, and Korean Patent Application No. 10-2014-0076731 filed on Jun. 23, 2014, which are hereby incorporated by reference as if fully set forth herein.

BACKGROUND

Field of the Invention

The present invention relates to a liquid crystal display (LCD) device, and particularly, to an LCD device including a column spacer which increases an aperture ratio and prevents light from being leaked.

Discussion of the Related Art

LCD devices are suitable as a display device for televisions (TVs) and portable devices because the LCD devices are easily manufactured due to the advance of manufacturing technology and realize drivability of a driver, low power consumption, and a high-quality image. The LCD devices adjust a transmittance of light passing through a liquid crystal layer of a pixel according to an image signal input from the outside to display an image based on the image signal.

The LCD device includes a first substrate (a thin film transistor (TFT) array substrate), a second substrate (a color filter array substrate), and a liquid crystal layer formed between the first substrate and the second substrate.

In the first substrate, a plurality of data lines and a plurality of gate lines are formed to intersect each other, and a plurality of pixels are defined. A TFT which is a switching element is formed in each of the plurality of pixels.

A planarizing layer is formed to cover the TFT. The planarizing layer is formed of photo acryl (PAC) to have a thickness of 2.0 µm. A passivation layer is formed on the planarizing layer, and a first alignment layer is formed on the passivation layer.

The second substrate includes a plurality of black matrixes, a plurality of red (R), green (G), and blue (B) color filters, an overcoat layer, a plurality of column spacers, and a second alignment layer. The black matrixes are formed in correspondence with a shielding area, and the color filters are formed in correspondence with an aperture area.

SUMMARY

Accordingly, the present invention is directed to provide an LCD device that substantially obviates one or more problems due to limitations and disadvantages of the related art.

An aspect of the present invention is directed to provide an LCD device which can prevent an alignment layer from being damaged by a movement of a column spacer.

Another aspect of the present invention is directed to provide an LCD device which can prevent an alignment direction of an alignment layer from being changed by a movement of a column spacer.

Another aspect of the present invention is directed to provide an LCD device which can prevent light from being leaked and in which an aperture ratio is enhanced.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an apparatus including: a color filter (CF) substrate having a black matrix layer; a thin-film transistor (TFT) substrate facing said CF substrate; a column spacer array, between said CF substrate and said TFT substrate, corresponding to certain portions of said black matrix layer; and a structure, between said CF substrate and said TFT substrate, corresponding to said column spacer array and configured to protect said column spacer array from damage due to external pressure.

Said column spacer array may include: a first group of column spacers that have a first height, and a second group of column spacers that have a second height smaller than said first height.

Said structure may include a bumper that corresponds to and faces at least one among said first group of column spacers and second group of column spacers to provide a buffer from external pressure being applied thereto.

Said bumper may be in proximity to a distal end surface of one or more column spacers and configured to absorb impacts applied to said column spacers due to external pressure.

Said bumper may have a specific thickness that is sufficient to absorb said impacts.

Said bumper may be located above a common electrode on said TFT substrate.

Said bumper may include one or more organic layers, one or more inorganic layers, or a combination of said organic layers and said inorganic layers Said thin-film transistor (TFT) substrate may include an alignment layer, and said structure may be further configured to protect said alignment layer from damage due to external pressure.

In another aspect of the present invention, there is provided a liquid crystal display (LCD) device including: a first substrate configured to include a plurality of pixels; a second substrate configured to include a black matrix that divides each of the plurality of pixels into a shielding area and an aperture area; a first column spacer disposed on one of the first and second substrates in correspondence with the shielding area; and a second column spacer disposed to face the first column spacer, and configured to buffer external pressure applied to the first column spacer.

The second column spacer may have a structure which brings the first column spacer in contact with the second column spacer prior to the first and second substrates when the external pressure is applied.

The second column spacer may extend in the same direction as a direction of a gate line and may be disposed at a position corresponding to the aperture area, and the second column spacer may absorb an impact which is applied to the first column spacer by the external pressure.

The second column spacer may be configured with one or more organic layers, one or more inorganic layer, or a combination of an organic layer and an inorganic layer.

An area of a top of the second column spacer may be broader than an area of a distal end of the first column spacer.

The plurality of pixels may be arranged in the order of a blue pixel, a red pixel, and a green pixel, and the first and second column spacers may be disposed in correspondence with the shielding area between the blue pixel and the red pixel.

The plurality of pixels may be arranged in the order of a blue pixel, a red pixel, and a green pixel, and the first and second column spacers may be disposed in correspondence with the shielding area between the red pixel and the green pixel.

In addition, other features and effects of the present invention can be newly construed from the embodiments of the present invention.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
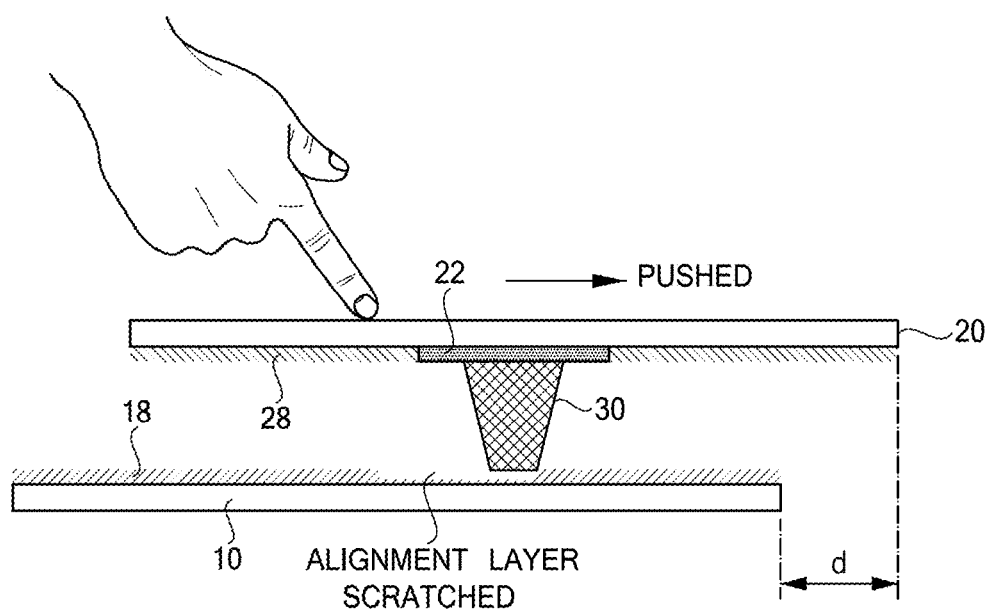
FIG. 1 is a diagram showing a phenomenon in which an alignment layer is damaged and alignment is distorted due to a movement of a column spacer in a LCD device.

Reference will now be made in detail to the exemplary embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In description of embodiments of the present invention, when a structure (for example, an electrode, a line, a wiring, a layer, or a contact) is described as being formed at an upper portion/lower portion of another structure or on/under the other structure, this description should be construed as including a case where the structures contact each other and moreover, a case where a third structure is disposed therebetween.

In describing a time relationship, for example, when the temporal order is described as 'after,' 'subsequent,' 'next,' and 'before,' a case which is not continuous may be included unless 'just' or 'direct' is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

The present invention proposes an LCD device which can prevent an alignment layer from being damaged by a movement of a column spacer. The present invention proposes an LCD device which can prevent an alignment direction of an alignment layer from being changed by a movement of a column spacer. The present invention proposes an LCD device in which an aperture ratio is enhanced.

FIG. 1 is a diagram showing a problem in which an alignment layer is damaged and alignment is distorted due to a movement of a column spacer in a LCD device.

Referring to FIG. 1, the plurality of column spacers 30 are formed in an area, corresponding to the black matrix 22, on the overcoat layer. The plurality of column spacers 30 include a gap spacer, which maintains a cell gap between the first substrate 10 and the second substrate 20, and a push spacer that forms a push gap between the first substrate 10 and the second substrate 20. A second alignment layer 28 is formed to cover the plurality of column spacers 30. In FIG. 1, the gap spacer among the plurality of gap spacers and the plurality of push spacers is illustrated.

When a screen is touched by a finger, a pressure is applied to the LCD device, and thus, the second substrate 20 is moved, and the column spacer 30 formed on the second substrate 20 is moved. Also, when the applied pressure is released, the second substrate 20 is moved to the left to return to the original position, and the column spacer 30 formed on the second substrate 20 is also moved to the original position.

Here, the first alignment layer 18 and the second alignment layer 28 are aligned in a certain direction. However, the column spacer 30 is moved, and thus, an alignment direction is changed in an area contacting the first alignment layer 18. Also, when an external force is strongly applied, the column spacer 30 is moved, and for this reason, the first alignment layer 18 is scratched. When an alignment layer is damaged, an alignment direction is changed.

Figure 2:
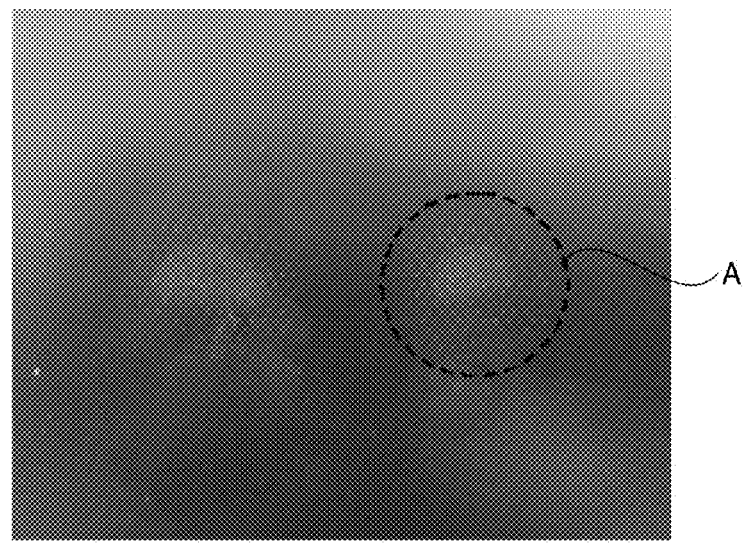
FIG. 2 is a diagram showing a light leakage caused by a scratch of an alignment layer.

FIG. 2 is a diagram showing a light leakage caused by a scratch of an alignment layer.

Referring to FIG. 2, when an alignment direction is changed because the first alignment layer 18 is scratched, liquid crystal molecules are aligned in a different direction, and thus, a transmittance of light is changed. At this time, an area in which a scratch occurs due to a contact with the first alignment layer 18 caused by a movement of the column spacer 30 is not covered by the black matrix 22, and for this reason, light leakage occurs as shown in a portion A.

In order to prevent light leakage, the column spacer 30 is moved, and thus, an area of the black matrix 22 should be enlarged to an area in which an alignment of the first alignment layer 18 is changed and an area in which the first alignment layer 18 is damaged. However, when an area of the black matrix 22 is enlarged, an aperture ratio of a pixel is lowered. That is, light leakage is reduced by broadening an area of the black matrix 22, but an aperture ratio of a pixel is lowered.

Moreover, since a design is made so that a black matrix disposed at a portion where a spacer is formed is asymmetrical with a black matrix disposed at a portion where a spacer is not formed, a transmittance difference between pixels occurs, and for this reason, a color difference occurs. When areas of all black matrixes are equally broadened for solving the problem, a color difference is removed, but transmittances of all pixels are reduced. Particularly, in a high-resolution model, a size of a pixel is reduced, but when an area of a black matrix is broadened for preventing a light leakage, a transmittance of a pixel is rapidly reduced.

Figure 3:
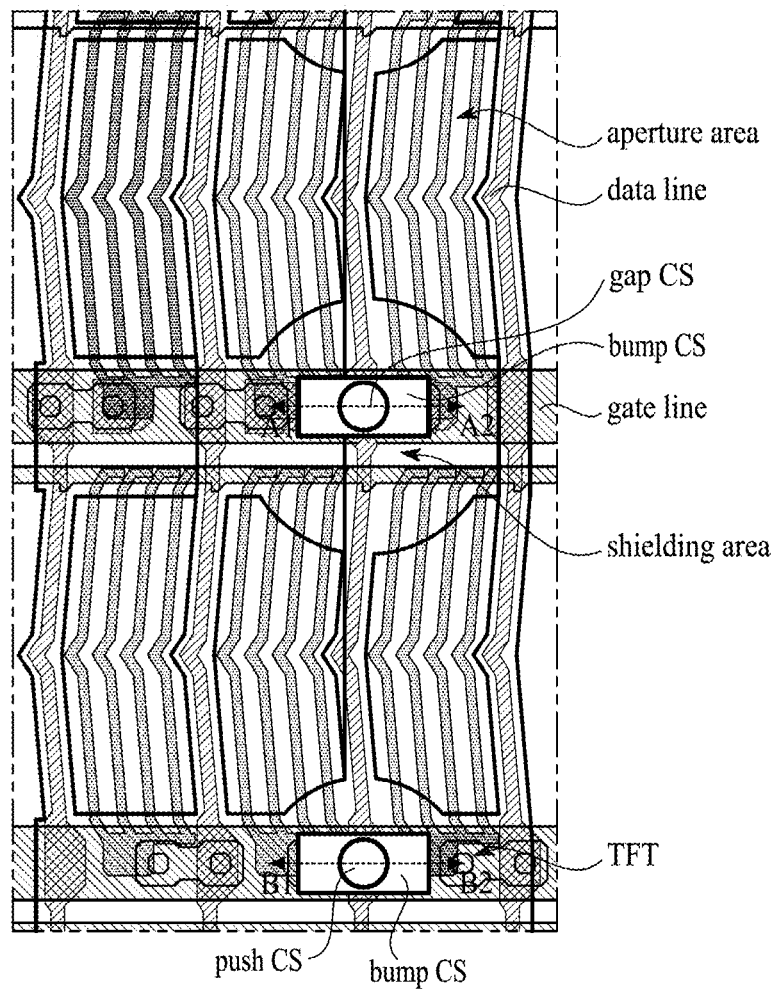
FIG. 3 is a plan view illustrating an LCD device according to a first embodiment of the present invention.
Figure 4:
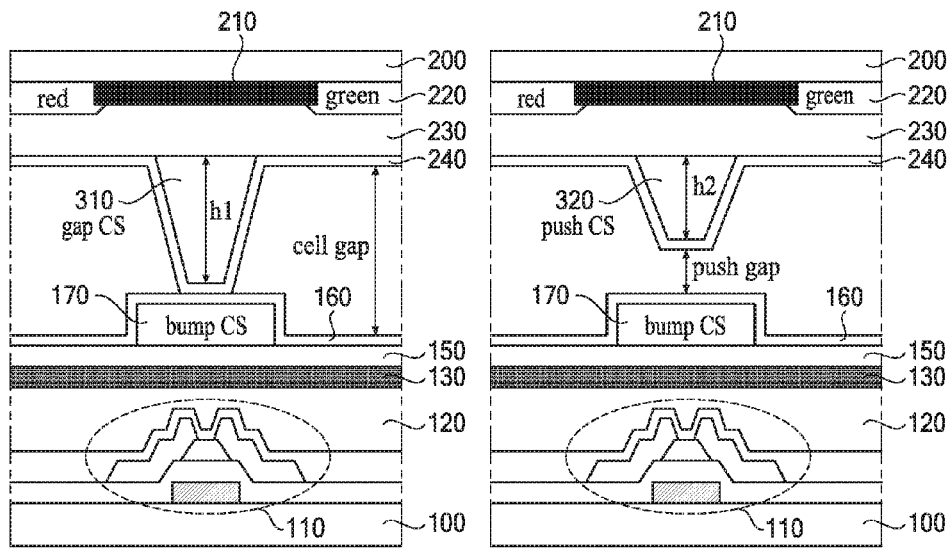
FIG. 4 is a cross-sectional view taken along line A1-A2 of FIG. 3 and a cross-sectional view taken along line B1-B2 of FIG. 3.

FIG. 3 is a plan view illustrating an LCD device according to a first embodiment of the present invention, and FIG. 4 is a cross-sectional view taken along line A1-A2 of FIG. 3 and a cross-sectional view taken along line B1-B2 of FIG. 3.

In FIG. 3, a backlight unit that supplies light to a liquid crystal panel and a driving circuit unit are not illustrated. In FIG. 3, some of a plurality of pixels of the LCD device are illustrated, and one of a plurality of gap spacers and one of a plurality of push spacers are illustrated.

Referring to FIGS. 3 and 4, the LCD device according to the first embodiment of the present invention includes a first substrate (a thin film transistor (TFT) array substrate) 100, a second substrate (a color filter array substrate) 200, and a liquid crystal layer (not shown) formed between the first substrate 100 and the second substrate 200.

The first substrate 100 is the TFT array substrate. An aperture area which displays an image by transmitting light and a shielding area through which the light cannot pass are formed on the first substrate 100.

In the first substrate 10, a plurality of data lines and a plurality of gate lines are formed to intersect each other, and a plurality of pixels are defined. A TFT 110 which is a switching element is formed in each of the plurality of pixels. The TFT 110 includes a gate electrode, an active layer, a source electrode, and a drain electrode. The active layer between the source electrode and the drain electrode is a channel of the TFT 110.

A planarizing layer 120 is formed to cover the TFT 110. The planarizing layer 120 is formed to a thickness 2.0 µm to 3.0 µm by coating photo acryl all over the first substrate 100. A step height of a surface of the first substrate 100 caused by the TFT 110 is removed by planarizing the first substrate 100 with the planarizing layer 120.

A common electrode 130 for supplying a common voltage Vcom to the pixels is formed on the planarizing layer 120. The common electrode 130 is formed of a transparent conductive material such as indium tin oxide (ITO) or indium zinc oxide (IZO). The common electrode 130 may be formed all over the first substrate 100.

A passivation layer 150 is formed to cover the common electrode 130. The passivation layer 150 is formed of an inorganic layer of $SiO_2$ or $SiN_x$. Also, the passivation layer 150 may be formed of an organic layer of an organic material in addition to an inorganic material.

Although not shown, a pixel electrode is formed on the passivation layer 150 in the aperture area, and is connected to the drain electrode of the TFT 110.

A bump spacer 170 is formed in an area overlapping the TFT 110 on the passivation layer 150. The bump spacer 170 is formed to a thickness of 1.0 µm to 2.0 µm. The bump spacer 170 may be formed in a planar structure having a circular shape, or may be formed in a planar structure having a bar shape.

Here, a plurality of the bump spacers 170 having a bar shape are formed in the same direction as that of a gate line, and are formed over a blue pixel and a red pixel.

A first alignment layer 160 is formed on the passivation layer 150 and the bump spacer 170. The first alignment layer 160 may be formed of polyimide (PI).

A step height is formed on a surface of the first substrate 100 along a profile of the bump spacer 170. A column spacer is formed on the second substrate 200 in correspondence with the bump spacer 170 on the first substrate 100.

Figure 5:
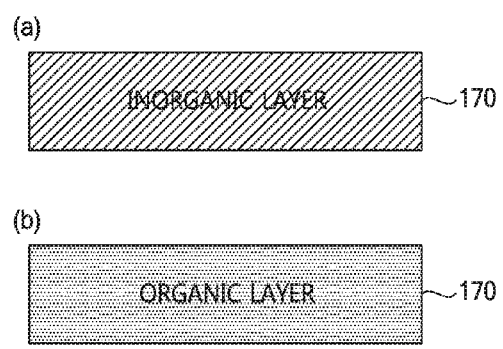
FIG. 5 is a diagram illustrating a bump spacer which is formed in a single layer structure of an inorganic layer or an organic layer.

FIG. 5 is a diagram illustrating a bump spacer which is formed in a single layer structure of an inorganic layer or an organic layer.

As illustrated in FIG. 5A, the bump spacer 170 may be formed of one inorganic layer by using an inorganic material.

As illustrated in FIG. 5B, the bump spacer 170 may be formed of one organic layer by using an organic material.

Figure 6:
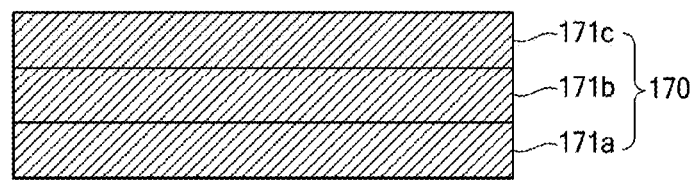
FIG. 6 is a diagram illustrating a bump spacer which is formed in a multi-layer structure where a plurality of inorganic layers are stacked.

FIG. 6 is a diagram illustrating a bump spacer which is formed in a multi-layer structure where a plurality of inorganic layers are stacked.

Referring to FIG. 6, the bump spacer 170 may be formed in a multi-layer structure where a plurality of inorganic layers 171a, 171b and 171c are stacked. In this case, a first inorganic layer 171a, a second inorganic layer 171b, and a third inorganic layer 171c may be formed of the same material. However, the present embodiment is not limited thereto, and the first inorganic layer 171a, the second inorganic layer 171b, and the third inorganic layer 171c may be formed of different materials.

The first inorganic layer 171a, the second inorganic layer 171b, and the third inorganic layer 171c may be formed to the same thickness, or may be formed to different thicknesses.

As described above, when the bump spacer 170 is formed in the multi-layer structure where the plurality of inorganic layers 171a, 171b and 171c are stacked, the bump spacer 170 may be thickly formed. Also, when the bump spacer 170 is formed in the multi-layer structure where the plurality of inorganic layers 171a, 171b and 171c are stacked, a thickness of the bump spacer 170 may be precisely adjusted.

Figure 7:
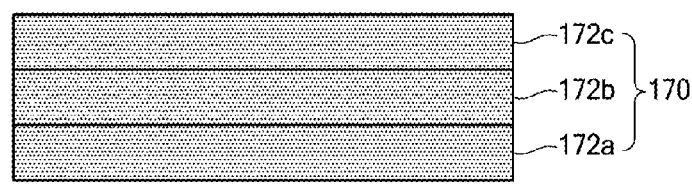
FIG. 7 is a diagram illustrating a bump spacer which is formed in a multi-layer structure where a plurality of organic layers are stacked.

FIG. 7 is a diagram illustrating a bump spacer which is formed in a multi-layer structure where a plurality of organic layers are stacked.

Referring to FIG. 7, the bump spacer 170 may be formed in a multi-layer structure where a plurality of organic layers 172a, 172b and 172c are stacked. In this case, a first organic layer 172a, a second organic layer 172b, and a third organic layer 172c may be formed of the same material. However, the present embodiment is not limited thereto, and the first organic layer 172a, the second organic layer 172b, and the third organic layer 172c may be formed of different materials.

The first organic layer 172a, the second organic layer 172b, and the third organic layer 172c may be formed to the same thickness, or may be formed to different thicknesses.

As described above, when the bump spacer 170 is formed in the multi-layer structure where the plurality of organic layers 172a, 172b and 172c are stacked, the bump spacer 170 may be thickly formed. Also, when the bump spacer 170 may be formed in a multi-layer structure where the plurality of organic layers 172a, 172b and 172c are stacked, a thickness of the bump spacer 170 may be precisely adjusted.

Figure 8:
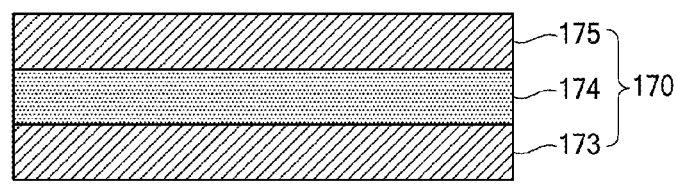
FIGS. 8 and 9 are diagrams illustrating a bump spacer which is formed in a multi-layer structure where an inorganic layer and an organic layer are stacked.
Figure 9:
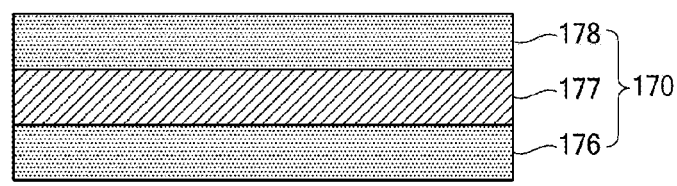

FIGS. 8 and 9 are diagrams illustrating a bump spacer which is formed in a multi-layer structure where an inorganic layer and an organic layer are stacked.

First, referring to FIG. 8, the bump spacer 170 may be formed in a multi-layer structure where a plurality of inorganic layers 173 and 175 and one organic layer 174 are stacked. The bump spacer 170 may be formed in a multi-layer structure where the organic layer 174 is formed between the first inorganic layer 173 and the second inorganic layer 175.

A first inorganic layer 173 and a second inorganic layer 175 may be formed of the same material, but the present embodiment is not limited thereto. The first inorganic layer 173 and the second inorganic layer 175 may be formed of different materials.

The first inorganic layer 173 and the second inorganic layer 175 may be formed to the same thickness, or may be formed to different thicknesses. Also, the organic layer 174 may be formed thicker than the first inorganic layer 173 and the second inorganic layer 175.

As described above, when the bump spacer 170 is formed in the multi-layer structure where the organic layer 174 is formed between the first inorganic layer 173 and the second inorganic layer 175, the bump spacer 170 may be thickly formed. Also, when the bump spacer 170 is formed in the multi-layer structure where the organic layer 174 is formed between the first inorganic layer 173 and the second inorganic layer 175, a thickness of the bump spacer 170 may be precisely formed.

Next, referring to FIG. 9, the bump spacer 170 may be formed in a multi-layer structure where a plurality of organic layers 176 and 178 and one inorganic layer 177 are stacked. The bump spacer 170 may be formed in a multi-layer structure where the inorganic layer 177 is formed between the first organic layer 176 and the second organic layer 178.

A first organic layer 176 and a second organic layer 178 may be formed of the same material, but the present embodiment is not limited thereto. The first organic layer 176 and the second organic layer 178 may be formed of different materials.

The first organic layer 176 and the second organic layer 178 may be formed to the same thickness, or may be formed to different thicknesses. Also, the first organic layer 176 and the second organic layer 178 may be formed thicker than the inorganic layer 177.

As described above, when the bump spacer 170 is formed in the multi-layer structure where the inorganic layer 177 is formed between the first organic layer 176 and the second organic layer 178, the bump spacer 170 may be thickly formed. Also, when the bump spacer 170 is formed in the multi-layer structure where the inorganic layer 177 is formed between the first organic layer 176 and the second organic layer 178, a thickness of the bump spacer 170 may be precisely formed.

A configuration of the second substrate 200 will be described with reference to FIG. 4.

The second substrate 200 includes a plurality of black matrixes 210, a plurality of red (R), green (G), and blue (B) color filters 220, an overcoat layer 230, a plurality of column spacers 310 and 320, and a second alignment layer 240. The black matrixes 210 are formed in correspondence with a shielding area, and the red (R), green (G), and blue (B) color filters 220 are formed in correspondence with an aperture area.

The black matrix 210 may be formed to overlap the TFT 110 formed on the first substrate (the TFT array substrate) 100, so as to minimize a reduction in an aperture area of a corresponding pixel.

The color filter 220 is formed by selectively coating and removing color pigments of red, green, and blue by using a mask, for displaying a color image.

The overcoat layer 230 is formed to cover the black matrix 210 and the color filter 220. The plurality of column spacers 310 and 320 are formed in an area, corresponding to the black matrix 210, on the overcoat layer 230.

The plurality of column spacers 310 and 320 include a gap spacer 310, which maintains a cell gap between the first substrate 100 and the second substrate 200, and a push spacer 320 that forms a push gap between the first substrate 100 and the second substrate 200. In FIG. 4, one of the plurality of gap spacers 310 and one of the plurality of push spacers 320 are illustrated.

Here, the gap spacer 310 and the push spacer 320 are disposed in correspondence with a shielding area between the blue pixel and the red pixel.

The second alignment layer 240 is formed to cover the plurality of column spacers 310 and 320. The second alignment layer 240 may be formed of polyimide (PI).

The plurality of column spacers 310 and 320 may be formed in a planar structure having a circular shape, or may be formed in a planar structure having a bar shape. An upper end of the gap spacer 310 contacting the overcoat layer 230 may be formed to have a width of 16 μm, and a lower end of the gap spacer 310 may be formed to have a width of 12 μm.

An upper end and a lower end of the push spacer 320 may be formed to have the same width as that of the gap spacer 310, but the present embodiment is not limited thereto. For example, the upper end and lower end of the push spacer 320 may be formed to have a broader width than that of the gap spacer 310. As another example, the upper end and lower end of the push spacer 320 may be formed to have a narrower width than that of the gap spacer 310. The gap spacer 310 and the push spacer 320 may be simultaneously formed by a single mask process using a half tone mask.

The gap spacer 310 and the push spacer 320 are formed to overlap the bump spacer 170 of the first substrate 100 and the black matrix 210 of the second substrate 200. A surface of the first substrate 100 protrudes along a profile of the bump spacer 170 formed on the first substrate 100. Also, the gap spacer 310 is formed in an area corresponding to the bump spacer 170, and maintains a cell gap between the first substrate 100 and the second substrate 200. In this case, the cell gap between the first substrate 100 and the second substrate 200 is 3.0 µm to 3.3 µm.

Here, a width of an upper end of the gap spacer 310 is formed narrower than that of the bump spacer 170. That is, the bump spacer 170 is formed to have a broader width than that of the gap spacer 310.

The push spacer 320 may be formed to have a lower height than that of the gap spacer 310. The surface of the first substrate 100 protrudes along the profile of the bump spacer 170 formed on the first substrate 100. Also, the push spacer 320 is formed in an area corresponding to the bump spacer 170, and thus, a push gap is formed between the first substrate 100 and the second substrate 200. In this case, a width of an upper end of the push spacer 320 is formed narrower than that of the bump spacer 170. That is, the bump spacer 170 is formed to have a broader width than that of the push spacer 320.

Here, the gap spacer 310 and the push spacer 320 may be disposed in correspondence with the shielding area between the blue pixel and the red pixel, but the present embodiment is not limited thereto. For example, the gap spacer 310 and the push spacer 320 may be disposed in correspondence with a shielding area between the red pixel and a green pixel.

A push gap of 5,000 Å to 6,000 Å is formed between the push spacer 320 and the bump spacer 170, and when an external force is applied to the second substrate 200, the push gap prevents the liquid crystal panel from being damaged because the second substrate 200 is pushed.

A step height is formed in the bump spacer 170, and the gap spacer 310 and the push spacer 320 become farther away from the first alignment layer 160 disposed in a display area. Even when the gap spacer 310 and the push spacer 320 are moved by an external force, the gap spacer 310 and the push spacer 320 do not contact the first alignment layer 160 disposed in the display area.

Since the first alignment layer 160 disposed in the display area is prevented from contacting the gap spacer 310 and the push spacer 320, an alignment direction of the first alignment layer 160 can be prevented from being changed, or the first alignment layer 160 can be prevented from being scratched.

Moreover, when the push spacer 320 is pushed by an external force and contacts the bump spacer 170, friction increases, thereby decreasing a movement of the gap spacer 310 and the push spacer 320.

In the LCD device according to the first embodiment of the present invention, the bump spacer 170 is formed on the first substrate 100 in correspondence with the gap spacer 310 and the push spacer 320 which are formed on the second substrate 200, and thus, even when the gap spacer 310 and the push spacer 320 are moved by an external force, the alignment layer formed in the aperture area can be prevented from being scratched.

Moreover, an alignment of each of the first and second alignment layers 160 and 240 is prevented from being changed in the aperture area, and the first alignment layer 160 of the first substrate 100 is prevented from being scratched by a movement of the gap spacer 310, thereby preventing a light leakage.

Particularly, light is prevented from being leaked by an external force when a touch is applied, and the push spacer 320 quickly contacts a surface in which the bump spacer 170 is formed, thereby preventing the gap spacer 310 from being collapsed. Also, a smear is prevented from occurring in a portion touched by a finger, and a margin of a shielding area for reducing light leakage is improved, thereby increasing an aperture ratio.

Figure 10:
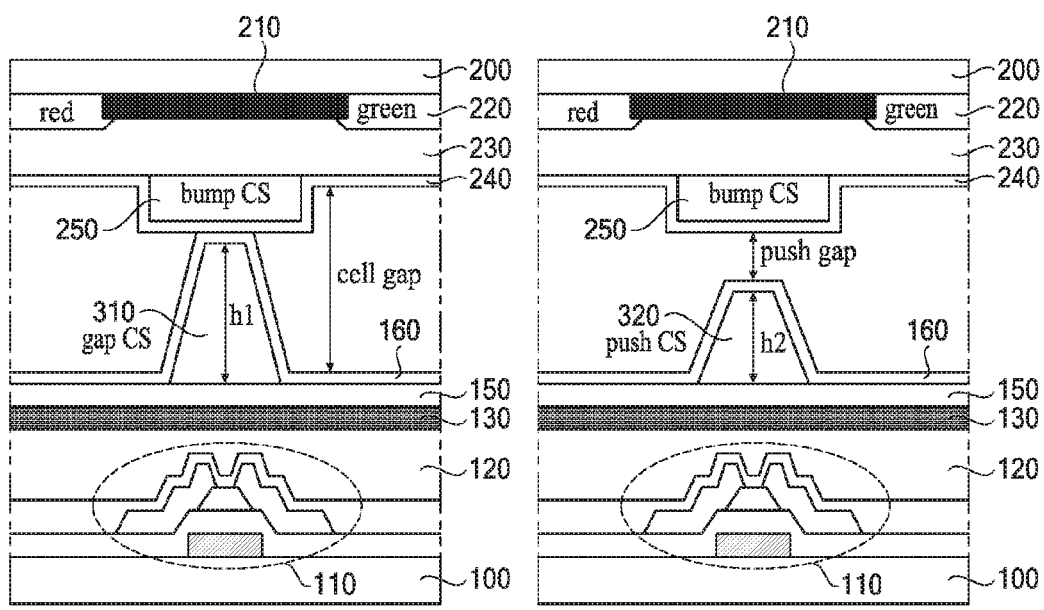
FIG. 10 is a cross-sectional view illustrating an LCD device according to a second embodiment of the present invention.

FIG. 10 is a cross-sectional view illustrating an LCD device according to a second embodiment of the present invention.

In FIG. 10, a backlight unit that supplies light to a liquid crystal panel and a driving circuit unit are not illustrated. In FIG. 10, some of a plurality of pixels of the LCD device are illustrated, and one of a plurality of gap spacers and one of a plurality of push spacers are illustrated.

Referring to FIG. 10, the LCD device according to the second embodiment of the present invention includes a first substrate (a thin film transistor (TFT) array substrate) 100, a second substrate (a color filter array substrate) 200, and a liquid crystal layer (not shown) formed between the first substrate 100 and the second substrate 200.

The first substrate 100 is the TFT array substrate. An aperture area which displays an image by transmitting light and a shielding area through which the light cannot pass are formed on the first substrate 100.

In the first substrate 10, a plurality of data lines and a plurality of gate lines are formed to intersect each other, and a plurality of pixels are defined. A TFT 110 which is a switching element is formed in each of the plurality of pixels. The TFT 110 includes a gate electrode, an active layer, a source electrode, and a drain electrode. The active layer between the source electrode and the drain electrode is a channel of the TFT 110.

A planarizing layer 120 is formed to cover the TFT 110. The planarizing layer 120 is formed to a thickness 2.0 µm to 3.0 µm by coating photo acryl all over the first substrate 100. A step height of a surface of the first substrate 100 caused by the TFT 110 is removed by planarizing the first substrate 100 with the planarizing layer 120.

A common electrode 130 for supplying a common voltage Vcom to the pixels is formed on the planarizing layer 120. The common electrode 130 is formed of a transparent conductive material such as indium tin oxide (ITO) or indium zinc oxide (IZO). The common electrode 130 may be formed all over the first substrate 100.

A passivation layer 150 is formed to cover the common electrode 130. The passivation layer 150 is formed of an inorganic layer of $SiO_2$ or $SiN_x$. Also, the passivation layer 150 may be formed of an organic layer of an organic material in addition to an inorganic material.

Although not shown, a pixel electrode is formed on the passivation layer 150 in the aperture area, and is connected to the drain electrode of the TFT 110.

A plurality of column spacers 310 and 320 are formed in an area overlapping the TFT 110 on the passivation layer 150. The plurality of column spacers 310 and 320 include a gap spacer 310, which maintains a cell gap between the first substrate 100 and the second substrate 200, and a push spacer 320 that forms a push gap between the first substrate 100 and the second substrate 200.

Here, the gap spacer 310 and the push spacer 320 are disposed in correspondence with a shielding area between the blue pixel and the red pixel.

The first alignment layer 160 is formed to cover the plurality of column spacers 310 and 320. The first alignment layer 160 may be formed of polyimide (PI).

The plurality of column spacers 310 and 320 may be formed in a planar structure having a circular shape, or may be formed in a planar structure having a bar shape. A lower end of the gap spacer 310 contacting the passivation layer 150 may be formed to have a width of 16 μm, and an upper end of the gap spacer 310 may be formed to have a width of 12 μm.

An upper end and a lower end of the push spacer 320 may be formed to have the same width as that of the gap spacer 310, but the present embodiment is not limited thereto. For example, the upper end and lower end of the push spacer 320 may be formed to have a broader width than that of the gap spacer 310. The gap spacer 310 and the push spacer 320 may be simultaneously formed by a single mask process using a half tone mask.

The gap spacer 310 and the push spacer 320 are formed to overlap a bump spacer 250 and a black matrix 210 of the second substrate 200.

The second substrate 200 includes a plurality of the black matrixes 210, a plurality of red (R), green (G), and blue (B) color filters 220, an overcoat layer 230, a plurality of the bump spacers 250, and a second alignment layer 240. The black matrixes 210 and the bump spacers 250 are formed in correspondence with a shielding area, and the red (R), green (G), and blue (B) color filters 220 are formed in correspondence with an aperture area.

The overcoat layer 230 is formed to cover the black matrixes 210 and the color filters 220. The plurality of bump spacers 250 are formed in an area, corresponding to the black matrix 210, on the overcoat layer 230.

The black matrix 210 and the bump spacer 250 may be formed to overlap the TFT 110 and the column spacers 310 and 320 formed on the first substrate (the TFT array substrate) 100, so as to minimize a reduction in an aperture area of a corresponding pixel.

The bump spacer 250 is formed to a thickness of 1.0 μm to 2.0 μm. The bump spacer 250 may be formed in a planar structure having a circular shape, or may be formed in a planar structure having a bar shape.

The second alignment layer 240 is formed to cover the plurality of bump spacers 250 and the overcoat layer 230. The second alignment layer 240 may be formed of polyimide (PI).

A gap spacer 310 and a push spacer 320 are formed on the first substrate 100 to overlap the bump spacer 250 and black matrix 210 of the second substrate 200.

A surface of the second substrate 200 protrudes along a profile of the bump spacer 250 formed on the second substrate 200, thereby forming a step height. Also, the gap spacer 310 is formed in an area corresponding to the bump spacer 250, and maintains a cell gap between the first substrate 100 and the second substrate 200. In this case, the cell gap between the first substrate 100 and the second substrate 200 is 3.0 μm to 3.3 μm.

Here, a width of a lower end of the gap spacer 310 is formed narrower than that of the bump spacer 250. That is, the bump spacer 250 is formed to have a broader width than that of the gap spacer 310.

The push spacer 320 may be formed to have a lower height than that of the gap spacer 310. The surface of the second substrate 200 protrudes along the profile of the bump spacer 250 formed on the second substrate 200, thereby forming a step height. Also, the push spacer 320 is formed in an area corresponding to the bump spacer 250, and thus, a push gap is formed between the first substrate 100 and the second substrate 200. In this case, a width of a lower end of the push spacer 320 is formed narrower than that of the bump spacer 250. That is, the bump spacer 250 is formed to have a broader width than that of the push spacer 320.

A push gap of 5,000 Å to 6,000 Å is formed between the push spacer 320 and the bump spacer 250, and when an external force is applied to the second substrate 200, the push gap prevents the liquid crystal panel from being damaged because the second substrate 200 is pushed.

Due to the bump spacer 250, the gap spacer 310 and the push spacer 320 become farther away from the second alignment layer 240 disposed in a display area. Even when the gap spacer 310 and the push spacer 320 are moved by an external force, the gap spacer 310 and the push spacer 320 do not contact the second alignment layer 240 disposed in the display area.

Since the second alignment layer 240 disposed in the display area is prevented from contacting the gap spacer 310 and the push spacer 320, an alignment direction of the second alignment layer 240 can be prevented from being changed, or the second alignment layer 240 can be prevented from being scratched.

Moreover, when the push spacer 320 is pushed by an external force and contacts the bump spacer 250, friction increases, thereby decreasing a movement of the gap spacer 310 and the push spacer 320.

For example, the bump spacer 250 may be formed of one inorganic layer by using an inorganic material. As another example, the bump spacer 250 may be formed of one organic layer by using an organic material.

The bump spacer 250 may be formed in a multi-layer structure where a plurality of inorganic layers are stacked. In this case, the plurality of inorganic layers may be formed of the same material. However, the present embodiment is not limited thereto, and the plurality of inorganic layers may be formed of different materials. The plurality of inorganic layers may be formed to the same thickness, or may be formed to different thicknesses.

The bump spacer 250 may be formed in a multi-layer structure where a plurality of organic layers are stacked. In this case, the plurality of organic layers may be formed of the same material. However, the present embodiment is not limited thereto, and the plurality of organic layers may be formed of different materials. The plurality of organic layers may be formed to the same thickness, or may be formed to different thicknesses.

As another example, the bump spacer 250 may be formed in a multi-layer structure where a plurality of inorganic layers and one organic layer are stacked. The bump spacer 250 may be formed in a multi-layer structure where an organic layer is formed between a first inorganic layer and a second inorganic layer. The first inorganic layer and the second inorganic layer may be formed of the same material. However, the present embodiment is not limited thereto, and the first inorganic layer and the second inorganic layer may be formed of different materials.

The first inorganic layer and the second inorganic layer may be formed to the same thickness, or may be formed to different thicknesses. Also, the organic layer may be formed thicker than the first inorganic layer and the second inorganic layer.

The bump spacer 250 may be formed in a multi-layer structure where a plurality of organic layers and one inorganic layer are stacked. The bump spacer 250 may be formed in a multi-layer structure where an inorganic layer is formed between a first organic layer and a second organic layer. The first organic layer and the second organic layer may be formed of the same material. However, the present embodiment is not limited thereto, and the first organic layer and the second organic layer may be formed of different materials.

The first organic layer and the second organic layer may be formed to the same thickness, or may be formed to different thicknesses. Also, the first organic layer and the second organic layer may be formed thicker than the inorganic layer.

As described above, when the bump spacer 250 is formed in the multi-layer structure, the bump spacer 250 may be thickly formed. Also, when the bump spacer 250 is formed in the multi-layer structure, a thickness of the bump spacer 250 may be precisely adjusted.

In the LCD device according to the second embodiment of the present invention, the gap spacer 310 and the push spacer 320 which are formed on the second substrate 200 is formed on the first substrate 100 in correspondence with the bump spacer 250, and thus, even when the gap spacer 310 and the push spacer 320 are moved by an external force, the alignment layer formed in the aperture area can be prevented from being scratched.

Moreover, an alignment of each of the first and second alignment layers 160 and 240 is prevented from being changed in the aperture area, and the second alignment layer 240 of the second substrate 200 is prevented from being scratched by a movement of the gap spacer 310, thereby preventing a light leakage.

Particularly, light is prevented from being leaked by an external force when a touch is applied, and the push spacer 320 quickly contacts a surface in which the bump spacer 250 is formed, thereby preventing the gap spacer 310 from being collapsed. Also, a smear is prevented from occurring in a portion touched by a finger, and a margin of a shielding area for reducing light leakage is improved, thereby increasing an aperture ratio.

In the present invention described above with reference to the drawings, an LCD device having an in-plane switching (IPS) mode or a fringe field switching (FFS) mode where a pixel electrode and a common electrode are formed on a TFT array substrate has been described above as an example. However, the present invention is not limited thereto. The above-described column spacer structure according to the present invention may be applied to a twisted nematic (TN) mode or a vertical alignment (VA) mode where the pixel electrode is formed on the TFT array substrate and the common electrode is formed on a color filter array substrate.

In the LCD device according to the embodiments of the present invention, the gap spacer and the push spacer are formed on the first substrate, and the plurality of bump spacers are formed on the second substrate.

In the LCD device according to the embodiments of the present invention, the gap spacer and the push spacer are formed on the second substrate, and the plurality of bump spacers are formed on the first substrate.

In the LCD device according to the embodiments of the present invention, the plurality of pixels are arranged in the order of a blue pixel, a red pixel, and a green pixel.

In the LCD device according to the embodiments of the present invention, the gap spacer and the push spacer are disposed in correspondence with a shielding area between the blue pixel and the red pixel, or are disposed in correspondence with a shielding area between the red pixel and the green pixel.

In the LCD device according to the embodiments of the present invention, the plurality of bump spacers having the bar shape are formed over the blue pixel and the red pixel in the same direction as the gate line.

In the LCD device according to the embodiments of the present invention, the first electrode is formed on the planarizing layer, and is a common electrode.

The LCD device according to the embodiments of the present invention further includes a passivation layer formed on the first electrode.

In the LCD device according to the embodiments of the present invention, the plurality of bump spacers having the bar shape are formed on a top of the passivation layer.

The LCD device according to the embodiments of the present invention further includes a plurality of red, green, and blue color filters formed on the second substrate in correspondence with an aperture area of the pixel.

The LCD device according to the embodiments of the present invention further includes an overcoat layer formed to cover the black matrix and the color filter.

In the LCD device according to the embodiments of the present invention, the plurality of bump spacers having the bar shape are formed in a single layer structure of an organic layer or an inorganic layer.

In the LCD device according to the embodiments of the present invention, the plurality of bump spacers having the bar shape are formed in a multi-layer structure including a plurality of organic layers or a plurality of inorganic layers.

In the LCD device according to the embodiments of the present invention, the plurality of bump spacers having the bar shape are formed in a multi-layer structure where an organic layer and an inorganic layer are stacked.

In the LCD device according to the embodiments of the present invention, a cell gap is formed by the gap spacer and the plurality of bump spacers having the bar shape.

In the LCD device according to the embodiments of the present invention, a push gap is formed by the push spacer and the bump spacer.

In the LCD device according to the embodiments of the present invention, a width of each of the plurality of bump spacers having the bar shape is formed broader than a width of each of the gap spacer and the push spacer.

In the LCD device according to the embodiments of the present invention, each of the plurality of bump spacers having the bar shape is formed to a thickness of 1.0 μm to 2.0 μm.

In the LCD device according to the embodiments of the present invention, the first alignment layer in the display area is prevented from contacting the gap spacer and the push spacer, and thus, the alignment direction of the first alignment layer is prevented from being changed, thereby preventing the first alignment from being scratched.

In the LCD device according to the embodiments of the present invention, when the push spacer is pushed by an external force and contacts the bump spacer, friction increases, thereby decreasing a movement of the gap spacer and the push spacer.

In the LCD device according to the embodiments of the present invention, the bump spacer is formed on the first substrate in correspondence with the gap spacer and the push spacer which are formed on the second substrate, and thus, even when the gap spacer and the push spacer are moved by an external force, the alignment layer formed in the aperture area can be prevented from being scratched.

In the LCD device according to the embodiments of the present invention, light is prevented from being leaked by an external force when a touch is applied, and the push spacer 320 quickly contacts a surface in which the bump spacer 170 is formed, thereby preventing the gap spacer 310 from being collapsed. Also, a smear is prevented from occurring in a portion touched by a finger, and a margin of a shielding area for reducing light leakage is improved, thereby increasing an aperture ratio.

In an aspect of the present invention, there is provided an apparatus including: a color filter (CF) substrate having a black matrix layer; a thin-film transistor (TFT) substrate facing said CF substrate; a column spacer array, between said CF substrate and said TFT substrate, corresponding to certain portions of said black matrix layer; and a structure (for example, the structure is the bump spacer 170 or 250), between said CF substrate and said TFT substrate, corresponding to said column spacer array and configured to protect said column spacer array from damage due to external pressure.

Said column spacer array may include: a first group of column spacers that have a first height, and a second group of column spacers that have a second height smaller than said first height.

Said structure may include a bumper (for example, the bumper is the bump spacer 170 or 250) that corresponds to and faces at least one among said first group of column spacers and second group of column spacers to provide a buffer from external pressure being applied thereto.

Said bumper may be in proximity to a distal end surface of one or more column spacers and configured to absorb impacts applied to said column spacers due to external pressure.

Said bumper may have a specific thickness that is sufficient to absorb said impacts.

Said bumper may be located above a common electrode on said TFT substrate.

Said bumper may include one or more organic layers, one or more inorganic layers, or a combination of said organic layers and said inorganic layers Said thin-film transistor (TFT) substrate may include an alignment layer, and said bumper may be further configured to protect said alignment layer from damage due to external pressure.

In another aspect of the present invention, there is provided a liquid crystal display (LCD) device including: a first substrate configured to include a plurality of pixels; a second substrate configured to include a black matrix that divides each of the plurality of pixels into a shielding area and an aperture area; a first column spacer disposed on one of the first and second substrates in correspondence with the shielding area; and a second column spacer disposed to face the first column spacer, and configured to buffer external pressure applied to the first column spacer.

The second column spacer may have a structure which brings the first column spacer in contact with the second column spacer prior to the first and second substrates when the external pressure is applied.

The second column spacer may extend in the same direction as a direction of a gate line and may be disposed at a position corresponding to the aperture area, and the second column spacer may absorb an impact which is applied to the first column spacer by the external pressure.

The second column spacer may be configured with one or more organic layers, one or more inorganic layer, or a combination of an organic layer and an inorganic layer.

An area of a top of the second column spacer may be broader than an area of a distal end of the first column spacer.

The plurality of pixels may be arranged in the order of a blue pixel, a red pixel, and a green pixel, and the first and second column spacers may be disposed in correspondence with the shielding area between the blue pixel and the red pixel.

The plurality of pixels may be arranged in the order of a blue pixel, a red pixel, and a green pixel, and the first and second column spacers may be disposed in correspondence with the shielding area between the red pixel and the green pixel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. An apparatus comprising:
   a color filter (CF) substrate having a black matrix layer;
   a thin-film transistor (TFT) substrate facing said CF substrate;
   a column spacer array, between said CF substrate and said TFT substrate, corresponding to certain portions of said black matrix layer; and
   a structure, between said CF substrate and said TFT substrate, corresponding to said column spacer array and configured to protect said column spacer array from damage due to external pressure,
   wherein said column spacer array comprises a first column spacer that have a first height, and a second column spacer that have a second height smaller than said first height,
   wherein said structure comprises a first bumper that corresponds to and faces said first column spacer and a second bumper that corresponds to and faces said second column spacer to provide a buffer from external pressure being applied thereto,
   wherein each of said first and second bumpers has a first surface facing said column spacer array and a second surface opposite to the first surface, the second surface being substantially flat.

2. The apparatus of claim 1,
   wherein each of said first and second bumpers is in proximity to a distal end surface of one of said first and second column spacers and configured to absorb impacts applied to said column spacers due to external pressure.

3. The apparatus of claim 2, wherein each of said first and second bumpers has a specific thickness that is sufficient to absorb said impacts.

4. The apparatus of claim 2, wherein each of said first and second bumpers is located above a common electrode on said TFT substrate.

5. The apparatus of claim 2, wherein each of said first and second bumpers includes
   one or more organic layers, one or more inorganic layers, or a combination of said organic layers and said inorganic layers.

6. The apparatus of claim 5, wherein said thin-film transistor (TFT) substrate comprises an alignment layer, and said structure further configured to protect said alignment layer from damage due to external pressure.

7. A liquid crystal display (LCD) device comprising:
a first substrate configured to include a plurality of pixels;
a second substrate configured to include a black matrix that divides each of the plurality of pixels into a shielding area and an aperture area;
a first column spacer disposed on one of the first and second substrates in correspondence with the shielding area; and
a second column spacer disposed to face the first column spacer, and configured to buffer external pressure applied to the first column spacer,
wherein an area of a top of the second column spacer is broader than an area of a distal end of the first column spacer.

8. The LCD device of claim 7, wherein the second column spacer has a structure which brings the first column spacer in contact with the second column spacer prior to the first and second substrates when the external pressure is applied.

9. The LCD device of claim 7, wherein,
the second column spacer extends in the same direction as a direction of a gate line and is disposed at a position corresponding to the aperture area, and
the second column spacer absorbs an impact which is applied to the first column spacer by the external pressure.

10. The LCD device of claim 9, wherein the second column spacer is configured with one or more organic layers, one or more inorganic layer, or a combination of an organic layer and an inorganic layer.

11. The LCD device of claim 7, wherein,
the plurality of pixels are arranged in the order of a blue pixel, a red pixel, and a green pixel, and
the first and second column spacers are disposed in correspondence with the shielding area between the blue pixel and the red pixel.

12. The LCD device of claim 7, wherein,
the plurality of pixels are arranged in the order of a blue pixel, a red pixel, and a green pixel, and
the first and second column spacers are disposed in correspondence with the shielding area between the red pixel and the green pixel.

* * * * *